United States Patent [19]

Tompkins et al.

[11] Patent Number: 5,108,682
[45] Date of Patent: Apr. 28, 1992

[54] COEXTRUSION APPARATUS AND METHOD USING AN ELASTIC DIE FOR VARYING THE OUTER PROFILE OF A TUBULAR EXTRUDATE

[75] Inventors: Dale A. Tompkins, Akron; Richard W. Sicka, Brecksville, both of Ohio

[73] Assignee: Bridgestone/Firestone, Inc., Akron, Ohio

[21] Appl. No.: 557,674

[22] Filed: Jul. 24, 1990

[51] Int. Cl.$^5$ .............................................. B29C 47/22
[52] U.S. Cl. ..................................... 264/167; 264/173;
264/174; 264/209.2; 425/114; 425/133.1;
425/381; 425/462; 425/465; 425/466; 425/467
[58] Field of Search ............ 264/167, 173, 541, 209.8,
264/209.2, 174; 425/131.1, 133.1, 381, 192 R,
465, 466, , 462, 113, 114

[56] References Cited

U.S. PATENT DOCUMENTS

| | | | |
|---|---|---|---|
| 2,501,690 | 3/1950 | Prendergast | 18/13 |
| 2,736,921 | 3/1956 | Mulbarger et al. | 18/14 |
| 3,134,832 | 5/1964 | Smith | 264/167 |
| 3,453,690 | 7/1969 | Mayner | 425/192 R |
| 3,840,311 | 10/1974 | Wight | 425/133 |
| 3,940,221 | 2/1976 | Nissel | 425/141 |
| 4,029,458 | 6/1977 | Kim et al. | 425/135 |
| 4,038,017 | 7/1977 | Langecker | 425/466 |
| 4,149,839 | 4/1979 | Iwawaki et al. | 425/133.1 |
| 4,249,875 | 2/1981 | Hart et al. | 425/133.1 |
| 4,279,857 | 7/1981 | Feuerherm | 264/541 |
| 4,432,718 | 2/1984 | Wurzer | 425/466 |
| 4,472,129 | 9/1984 | Siard | 425/381 |
| 4,507,071 | 3/1985 | Hahn et al. | 425/133.1 |
| 4,578,024 | 3/1986 | Sicka et al. | 425/114 |
| 4,657,718 | 4/1987 | Sicka et al. | 264/146 |
| 4,776,909 | 10/1988 | Bohm et al. | 156/117 |
| 4,946,364 | 8/1990 | Wagner et al. | 425/72.1 |

FOREIGN PATENT DOCUMENTS

| | | | |
|---|---|---|---|
| 1370281 | 10/1974 | United Kingdom | 425/132 |
| 2050933A | 1/1981 | United Kingdom | 264/167 |

*Primary Examiner*—Jeffery Thurlow
*Attorney, Agent, or Firm*—Ernst H. Ruf

[57] ABSTRACT

Coextrusion apparatus for varying the outer profile of a generally tubular extrudate formed by inner and outer streams of elastomeric material by varying the annular end opening of an elastic die ring which varies the size of an outer extrusion orifice and consequently the flow of the outer stream of elastomeric material which is deposited on the outer surface of the tubular extrudate. A hydraulically moveable piston is axially slideably mounted for engagement with the elastic die ring and has a wedge-shaped camming surface which moves along the outer surface of the elastic die ring to vary the size of the outer extrusion orifice and consequently the amount of elastomeric material extrudated therethrough. A linear motion detector is connected to the piston to detect the amount of linear axial movement of the piston to provide control signals for controlling the movement of the piston. The orifice for the inner stream of elastomeric material is located slightly upstream of the orifice for the outer stream of elastomeric material and is generally fixed. A reinforcing guide directs a plurality of fiber-type reinforcing elements into the tubular extrudte generally at the merger of the inner and outer streams of elastomeric material. A method for varying the outer profile of the tubular extrudate is also presented.

19 Claims, 9 Drawing Sheets

COEXTRUSION APPARATUS AND METHOD USING AN ELASTIC DIE FOR VARYING THE OUTER PROFILE OF A TUBULAR EXTRUDATE

BACKGROUND OF THE INVENTION

1. Technical Field

The field of art to which this invention pertains is that of a coextrusion apparatus and method, particularly for use in manufacturing annular seamless components of elastomeric materials such as used in the production of pneumatic tires, specifically body plies for radial tires. More particularly the invention relates to such a coextrusion apparatus and method in which the outer profile of the tubular extrudate is varied by varying the amount of elastomeric material applied to the outer surface of the extrudate by an elastic die.

2. Background Information

Tubular components or articles such as pneumatic tire body plies, have previously generally been built by utilizing woven fabric and calendering the same with rubber stock which, when cut to size, entails wrapping the sheet component around a tire building drum and overlapping the ends of the sheet to produce an annulus with a generally axially parallel extending seam. In order to avoid this lapped or seamed construction, extrusion has been employed in the prior art whereby a tubular extrudate is produced containing reinforcement cords disposed therein.

Many of the problems with such lapped or seamed construction have been resolved by our previous invention of a coextrusion apparatus and method disclosed in U.S. Pat. Nos. 4,578,024 and 4,657,718 as well as a related product disclosed in U.S. Pat. No. 4,776,909, all of which are incorporated herein by reference in the interest of full disclosure. These earlier inventions provide a solution to the noted prior art problems by producing a generally tubular elastomeric ply or extrudate made up of first and second concentric tubular streams of elastomeric material having interposed adjacent their common interface, a closely and uniformly spaced array of parallel reinforcing elements.

In the building of a tire, the carcass or first stage body, consists of six elements namely, a body ply which is the reinforcing cord and skim, two sidewall bands or annuli, two body ply insert annuli and an inner liner. Heretofore assembly or placement of these six bands on a tire building drum required six separate manually performed steps wherein the individual strips were placed on the tire building drum. These various individual strips of rubber usually were formed of different elastomeric compositions in order to achieve different results when assembled into the final tire. The innerliner is formed of a highly air impervious material and is applied to the body ply to provide the barrier for retaining the air within a tubeless pneumatic tire. The particular compound of the inner liner provides such impermeability characteristics.

The present invention described below pertains particularly to the formation of the sidewall component or part thereof on the tubular body ply component of the vehicle tire, which also may contain the inner liner thereof when forming a first stage tire, wherein the body ply is extruded as a tubular extrudate and the innerliner, preferably of a permeable characteristic supplied by the inner flow channel is joined with the outer flow channel, the profile of which is varied to form the sidewall component or part thereof at distinct locations on the innerliner portion of the tubular extrudate.

The most pertinent prior art with respect to applying and varying the outer profile of a tubular extrudate are shown in the following U.S. patents.

U.S Pat. No. 3,134,832, discloses a method for extruding articles which comprises an extrusion die having a body and a cylindrical exterior sleeve. A central circular hole is provided and an elastomeric constrictive annulus which defines the extrusion aperture is positioned directly behind a flange. The annulus is held against the interior surface of the flange by a ring. As a gear is turned a follower is screwed into the exterior sleeve, pressing against the ring and annulus so that the annulus can expand inwardly under the compressive force in order to uniformly reduce the size of the hole in the annulus, i.e., reduce the size of the extrusion aperture.

U.S. Pat. No. 3,840,311, discloses an extrusion nozzle for manufacturing a plurality of frozen food type articles. This patent discloses an extrusion chamber having an inlet supply and terminating in an outlet orifice. A flexible wall formed from neoprene rubber can be attached to the casing wall adjacent the outlet in a conventional fashion. Five air cylinders are mounted on a frame which serve to indent a flexible wall so as to vary the shape of the wall and alter the dimensions of the exit orifice. U.S. Pat. No. 3,940,221, discloses a die with a controllable lower lip opening. A metal die block is provided with a passageway for receiving flowable material which has a lower lip portion and an upper lip. The opening between the lips can be adjusted by moving an elongated metal rod having a head. The metal rod extends through a heater block, so that when the temperature is increased, the elongated rod increases in temperature and expands. A lower end of the heated rod will then be forcibly displaced in an axial direction, to press upon flexible lip and bend downwardly slightly to narrow the gap between the lips and decrease the thickness of the sheet which is being extruded.

U.S. Pat. No. 4,279,857, discloses a shaping nozzle having a core member surrounded by a two part sleeve to define an annular passageway which terminates in an exit passage around an outwardly and downwardly flared central pin or mandrel An outer fixed ring surrounds an inner, elastic ring which has a substantially crescent shaped interior. A wedge engages an element and an outer ring, and movement of the wedge can determine the shape of the passageway at a given axial position An axially displaceable piston defines the size of the passageway. An elastic ring having a cylindrical inner surface defines a part of flow passageway. Also, axial displacement of a piston causes movement of a frustoconical surface that defines a wall of the passageway and is capable of changing the thickness and shape of the passageway adjacent the nozzle.

U.S. Pat. No. 4,432,718, discloses an extrusion head comprising a die core and a casing ring located within a head housing. Each die ring section is axially adjustable by positioning screws so that the lower edge boundary of the die gap will be changed. In this fashion the extruded tube material will have walls of variable thickness at predetermined points and the thickness of the extruded tube will increase or decrease as a result of changes in the outer circumference of the tube while its interior contour remains the same.

Certain of the prior art patents discussed above disclose an extrusion head which include means of varying the flow of material through an extrusion orifice to regulate the profile of the extrusion material. However, none of these patents disclose the specific configuration and use of an elastic die element as in applicants' apparatus and method steps set forth below. In particular, the prior art does not disclose a moveable elastic die in combination with a camming piston for modulating the flow of extrudate for varying the outer profile of the tubular product.

SUMMARY OF THE INVENTION

An objective of the invention is providing a solution to the noted prior art problem in terms of the apparatus and method by producing a generally tubular elastomeric extrudate in which the outer surface or profile thereof can be varied, especially for use in producing a first stage tire.

A further objective of the invention is to provide an extrusion apparatus and method in which the exterior profile of the extrudate, composite or body, can be applied substantially simultaneously with the formation of the tubular body; and in which the outer profile can be abruptly initiated, profiled and terminated with no smearing or contamination of the outer surface of the tubular extrudate whereby further processing of the tubular composite can be accomplished without harmful effects from any contamination.

Still another objective of the invention is to provide such a coextrusion apparatus and method in which filament-type or cord reinforcing elements are introduced into the tubular extrudate, generally, simultaneously with the formation of the tubular extrudate and generally, simultaneously with the applying of the profiled exterior surface on the tubular extrudate. A further objective of the invention is to provide such a coextrusion apparatus and method which will prepare a precise accurate, multi-component composite tubular member, intended primarily for formation of a pneumatic tire, having a profiled exterior surface, whereby the exterior surface can be profiled with different materials than that of the inner surface.

A still further objective of the invention is to provide such a coextrusion apparatus and method in which the outer profile preferably has ramped beginning and end configurations, providing a smooth merger with the outer surface of the tubular extrudate, and in which this smooth merger is accomplished by use of an elastic die which regulates the annular size of an outer extrusion orifice through which the elastomeric material flows to form the tubular extrudate.

Still a further objective of the invention is to provide such a coextrusion apparatus and method in which the varying of the outer profile is controlled principally by an elastic outer die and a hydraulically movable camming piston slideably engaged therewith, in which the piston is moved by hydraulic pressure that can be accurately controlled by programmable equipment or the like.

A still further objective of the invention is to provide such a coextrusion apparatus and method which is of a relatively rugged and durable construction, which can be easily disassembled for repair and maintenance, which can be used with commercially available extruders for receiving the supply of extrudate material, and in which the type of reinforcing elements incorporated therein can vary depending upon the particular tire product desired.

These objectives and advantages are obtained by the coextrusion apparatus of the invention for varying the outer profile of a tubular extrudate, the general nature of which may be stated as including die means for forming inner and outer annular extrusion orifices for forming the tubular extrudate, said die means having an elastic radially moveable die ring adjustably forming the outer extrusion orifice; first means for forming an outer flow channel for delivering a first stream of elastomeric material to the outer extrusion orifice of the die means to form an outer layer of the tubular extrudate; second means for forming an inner flow channel for delivering a second stream of elastomeric material to the inner extrusion orifice of the die means for forming an inner layer of the tubular extrudate; and third means for controlling the flow of the first stream of elastomeric material through the outer extrusion orifice to change the amount of said elastomeric material passing through said orifice to vary the profile of said outer surface, said third means having an axially moveable member engageable with the elastic die ring for varying an inside radius of an end opening of said die ring to vary the size of the outer extrusion orifice.

These objectives and advantages are further obtained by the improved method of the invention, the general nature of which may be stated as a method for varying the outer profile of a generally tubular extrudate during the formation of said extrudate, including the step of producing an outer independently controlled continuous annular hollow stream of elastomeric material moving axially within an extrusion head; producing an inner stream of elastomeric material within said coextrusion head which joins with the outer stream to form the generally tubular extrudate; forming an annular extrusion orifice through which the outer stream of elastomeric material moves to form the tubular extrudate by an annular elastic die member; and varying pressure on the elastic die member by an exterior moveable member to vary the size of the extrusion orifice to vary the amount of elastomeric material moving through the extrusion orifice from the outer stream to vary the outer profile of the extrudate.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
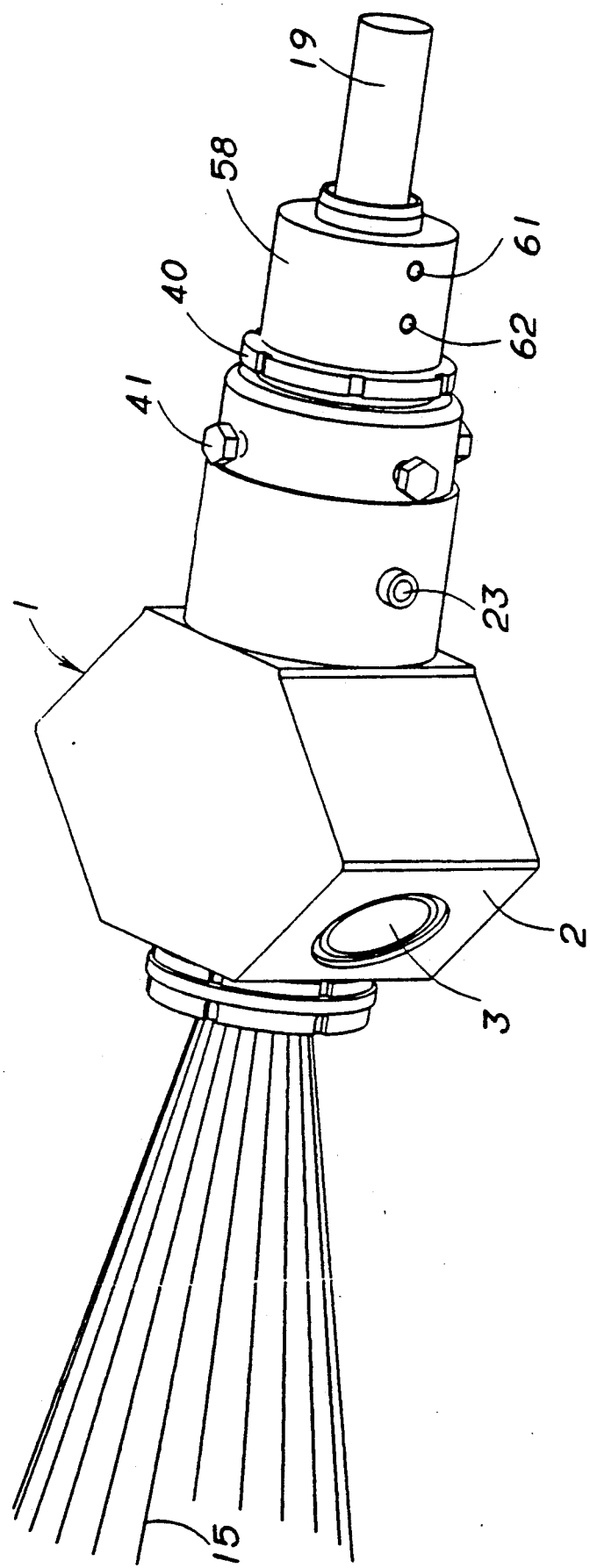
FIG. 1 is a perspective view of the coextrusion apparatus of the present invention.
Figure 2:
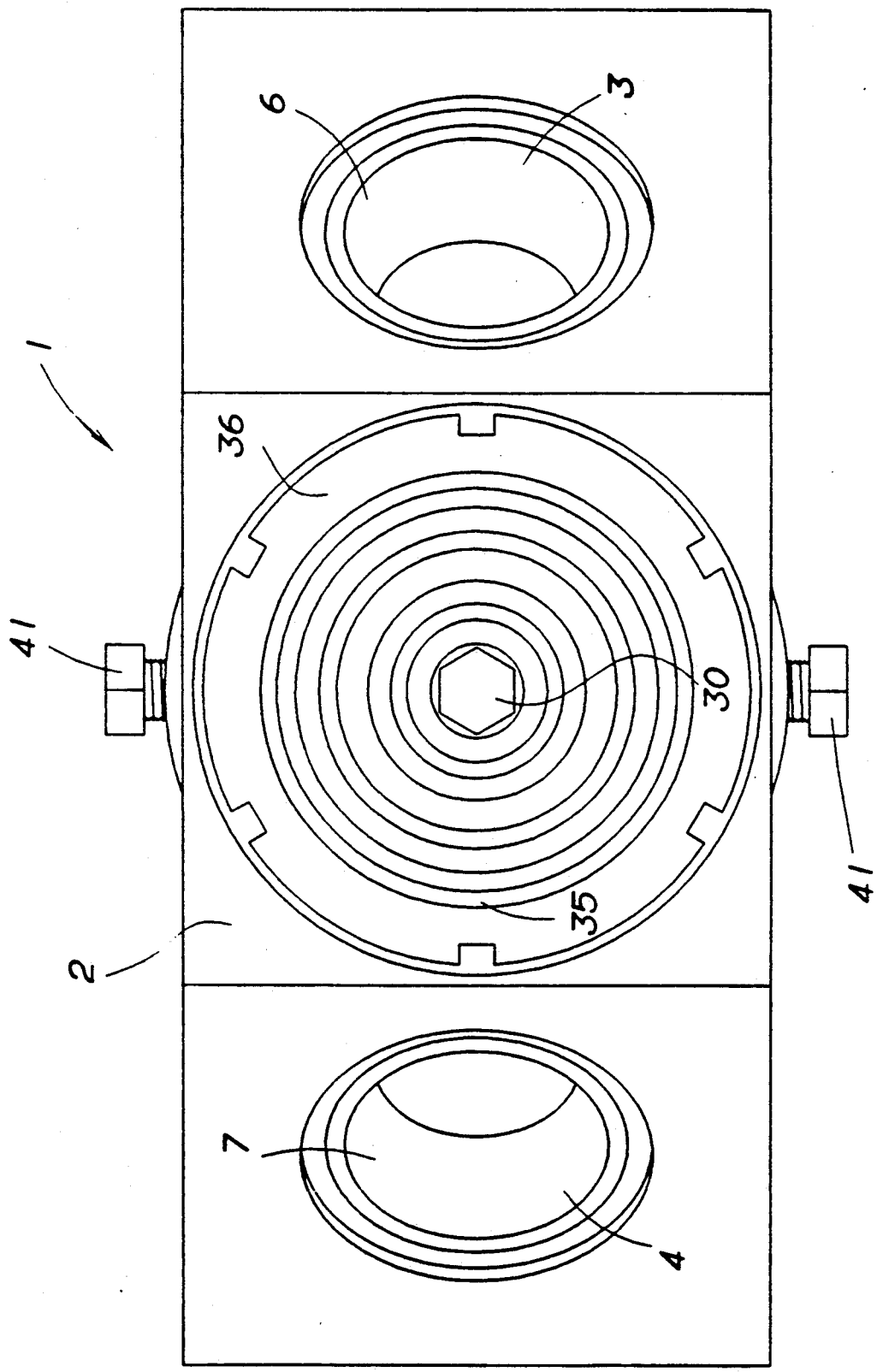
FIG. 2 is an enlarged elevational view of the entrance end of the coextrusion apparatus of FIG. 1.
Figure 3:
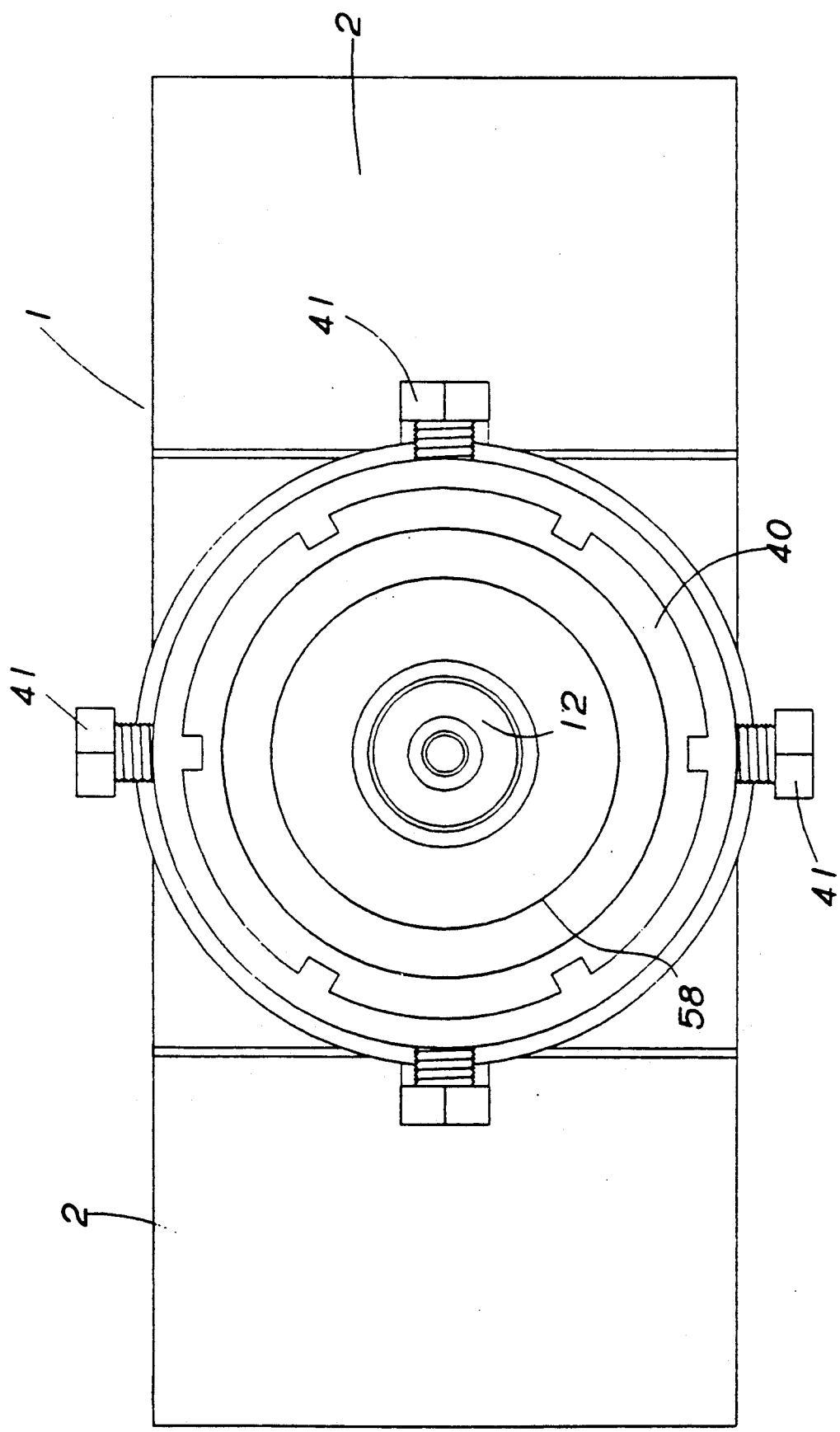
FIG. 3 is an enlarged elevational view of the exit end of the coextrusion apparatus of FIG. 1.

Referring specifically to FIGS. 1, 2 and 3, there is illustrated a perspective and end views of a coextrusion head, indicated generally at 1. Coextrusion head includes an outer shell or housing 2 formed with a pair of inlet feed apertures 3 and 4 (FIG. 4), which are adapted to be threadably connected to delivery conduits (not shown) through which separate streams 6 and 7 of elastomeric stock flow from one or more extruders. The elastomeric material flows into individual separate material flow channels 6A and 7A which are formed within the extrusion head for subsequent delivery to the extrusion orifices as described below. The apparatus and means of delivery of the separate streams of elastomeric material within the coextrusion head are similar in many respects to that shown in our prior U.S. Pat. Nos. 4,578,024 and 4,657,718. Inlet aperture 3 communicates with inner flow channel 6A for directing and guiding inner flow stream 6 of an elastomeric material, while inlet aperture 4 communicates with flow channel 7A for directing and guiding outer flow stream 7 of an elastomeric material (FIG. 4).

Inner stream 6 flows through channel 6A which is formed within shell 2 in a manner similar to that shown in the two patents set forth above, for subsequent discharge through a generally fixed inner annular orifice 10 (FIGS. 4-6) formed between the outer annular conical surface 11 of a pin 12 and the annular conical surface 13 of a guide assembly 14. Guide assembly 14 is similar to the guide assembly of previously noted U.S. Pat. Nos. 4,578,024 and 4,657,718 and is used for independently directing and accurately positioning a circular array of uniformly spaced, individual reinforcing elements 15 which are located within and extend through individual guide tubes 16. Reinforcing elements 15 generally take the form of filaments, threads, yarns or cords and include natural or synthetic textiles, steel, wire, fiberglass, etc. and are encapsulated within inner and outer streams 6 and 7 of elastomeric material and merge therewith at the junction of the elastomeric streams at an adjustable outer orifice 18. Outer orifice 18 is controlled in accordance with the invention to vary the outer profile of the tubular extrudate 19 formed by extrusion head 1, as described in greater detail below, and is located slightly downstream of inner orifice 10 (FIG. 5).

Temperature fluid control channels 20 and 21 are formed in shell 2 to permit heating and cooling of the interior and, in particular, to maintain the die assemblies at the desired operating temperatures. These channels are connected to a source of heating and cooling fluid by conduits which extend into threaded apertures 22 and 23 of channel cover plates 24 (FIG. 4). Also, heat exchangers may be mounted top and bottom on the large horizontal surface of shell 2 (not shown) as is well known in the extrusion head art.

Figure 4:
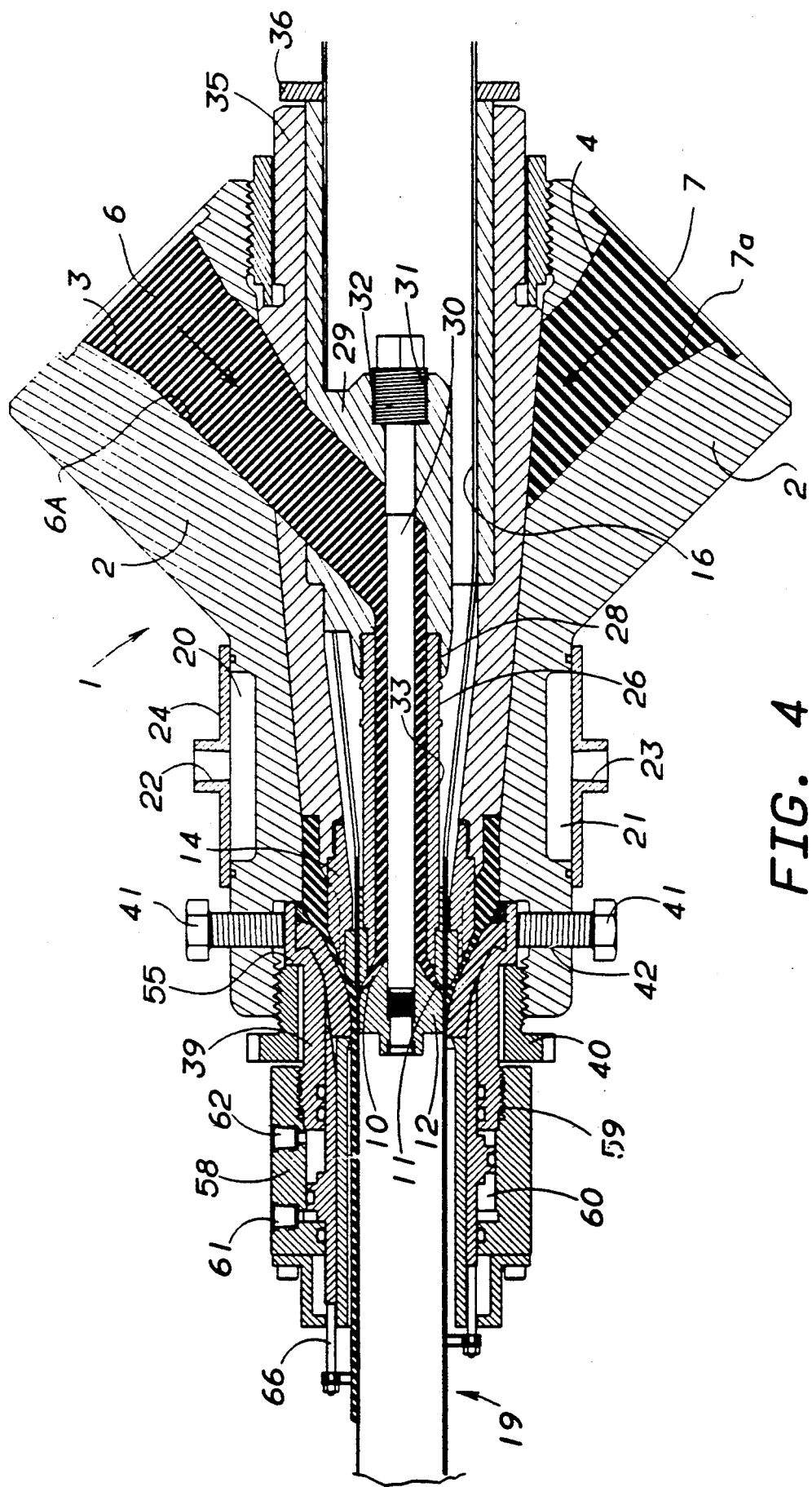
FIG. 4 is a vertical longitudinal sectional view of the extrusion apparatus of FIG. 1.
Figure 5:
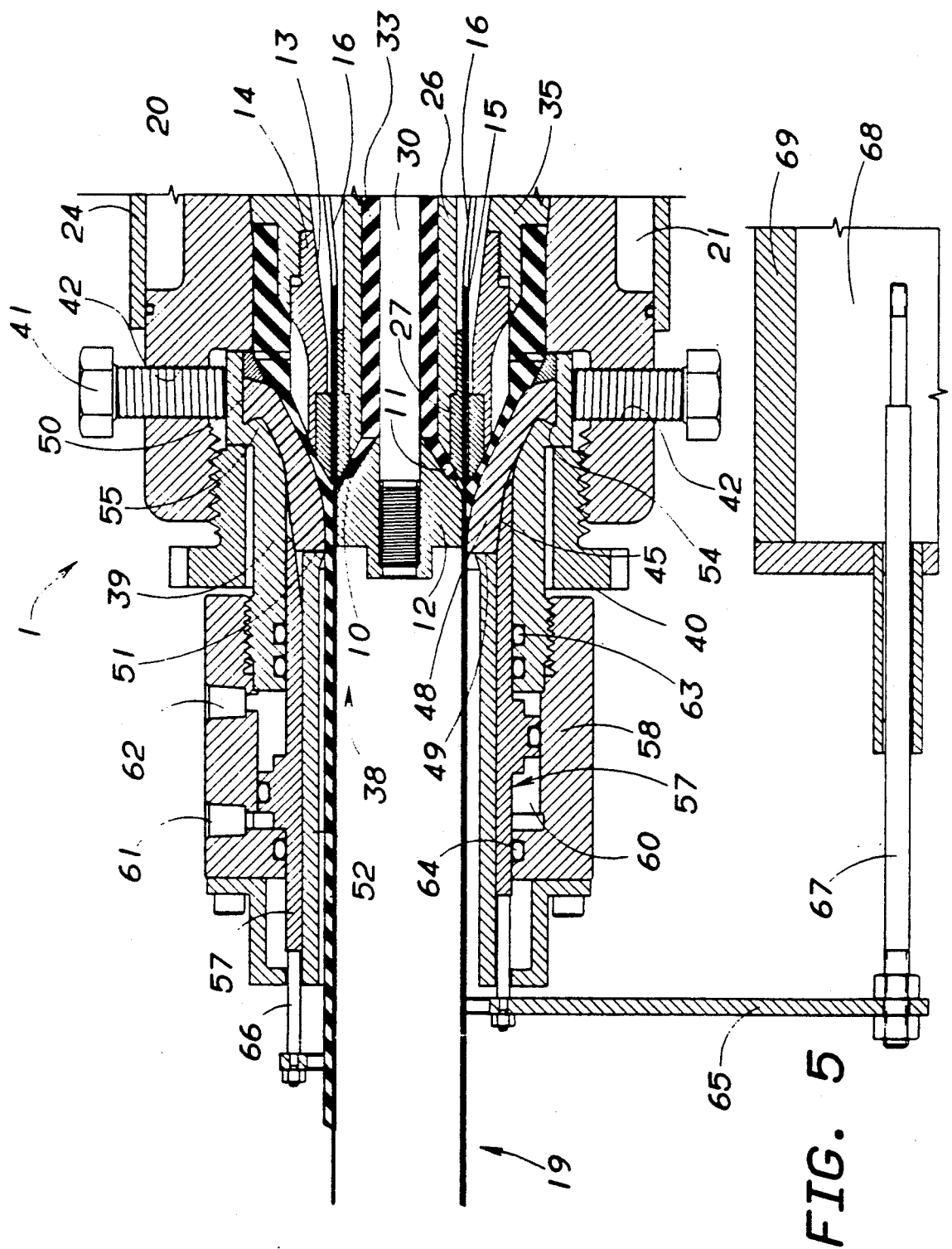
FIG. 5 is an enlarged fragmentary sectional view of the discharge end of the apparatus as shown in FIG. 4, with the elastic die ring shown in split open and closed positions.
Figure 6:
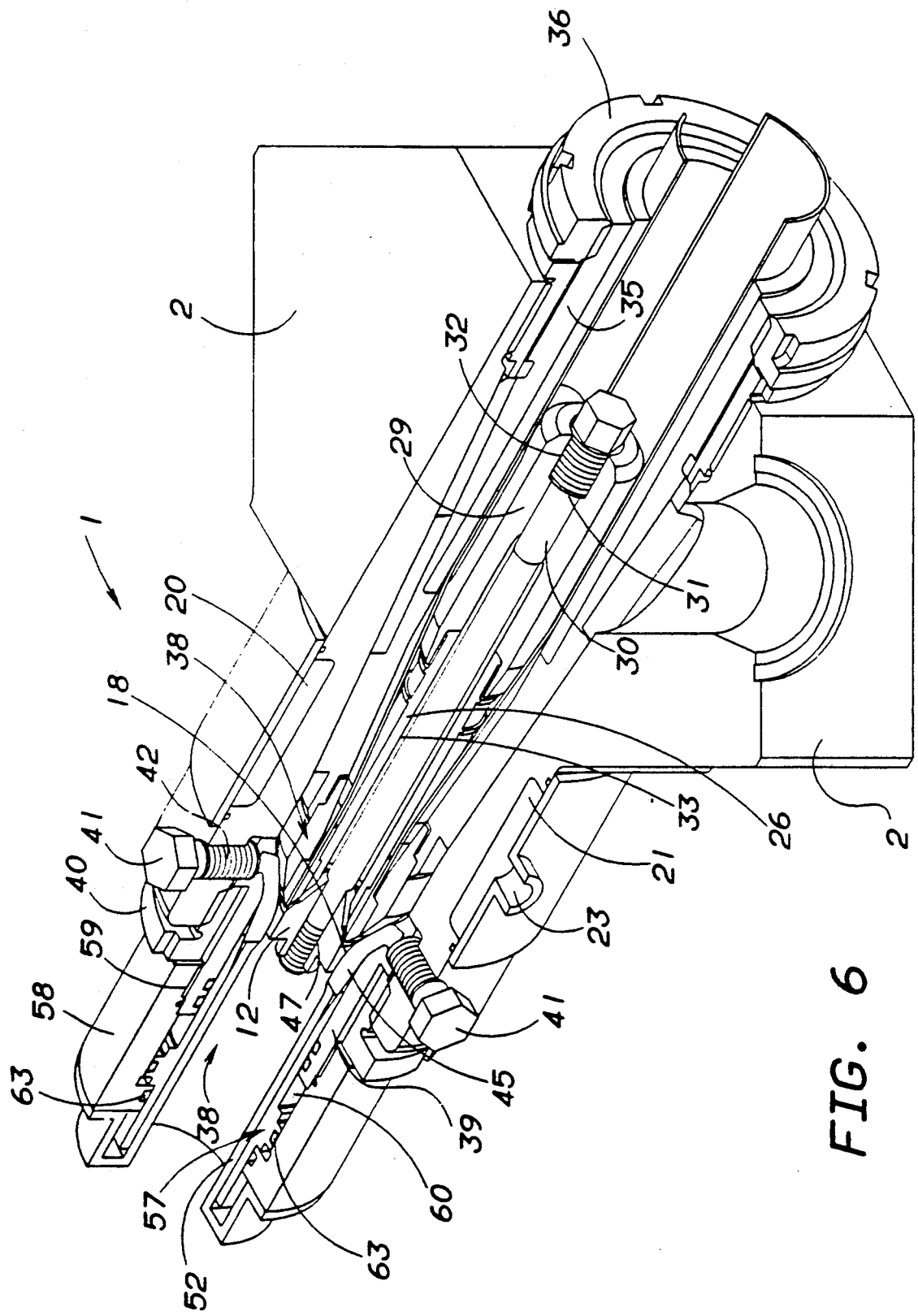
FIG. 6 is a perspective view with portions broken away of the coextrusion apparatus.

An annular tube 26 having a stepped forward end 27 which engages guide assembly 14, is fixably mounted within the central portion of extrusion head 1 by a rear threaded engagement 28 with an annular inner flow channel forming member 29 (FIG. 4). Pin 12 is fixably mounted within the forward or discharge end of extrusion head 1 by a solid rod 30 which extends coaxially through the hollow interior of tube 26 and has a threaded end 31 which is engaged within an interiorly threaded opening 32 formed in the rear of inner flow channel forming member 29 (FIGS. 4 and 6). Pin rod 30 forms an annular space 33 within the interior of tube 26 and provides an annular flow channel portion of inner flow channel 6A. Inner flow channel forming member 29 is connected with an annular outer flow channel forming member 35 by a threaded nut 36 or other attachment means.

An outer die assembly indicated generally at 38 (FIGS. 4-6), includes an annular outer hold ring 39 which is secured in a clamped abutting position with an outer end of shell 2, by a clamping nut 40 and a plurality of adjusting bolts 41. Bolts 41 are threadably engaged within threaded holes 42 formed in the outer end of shell 2.

Figure 7:
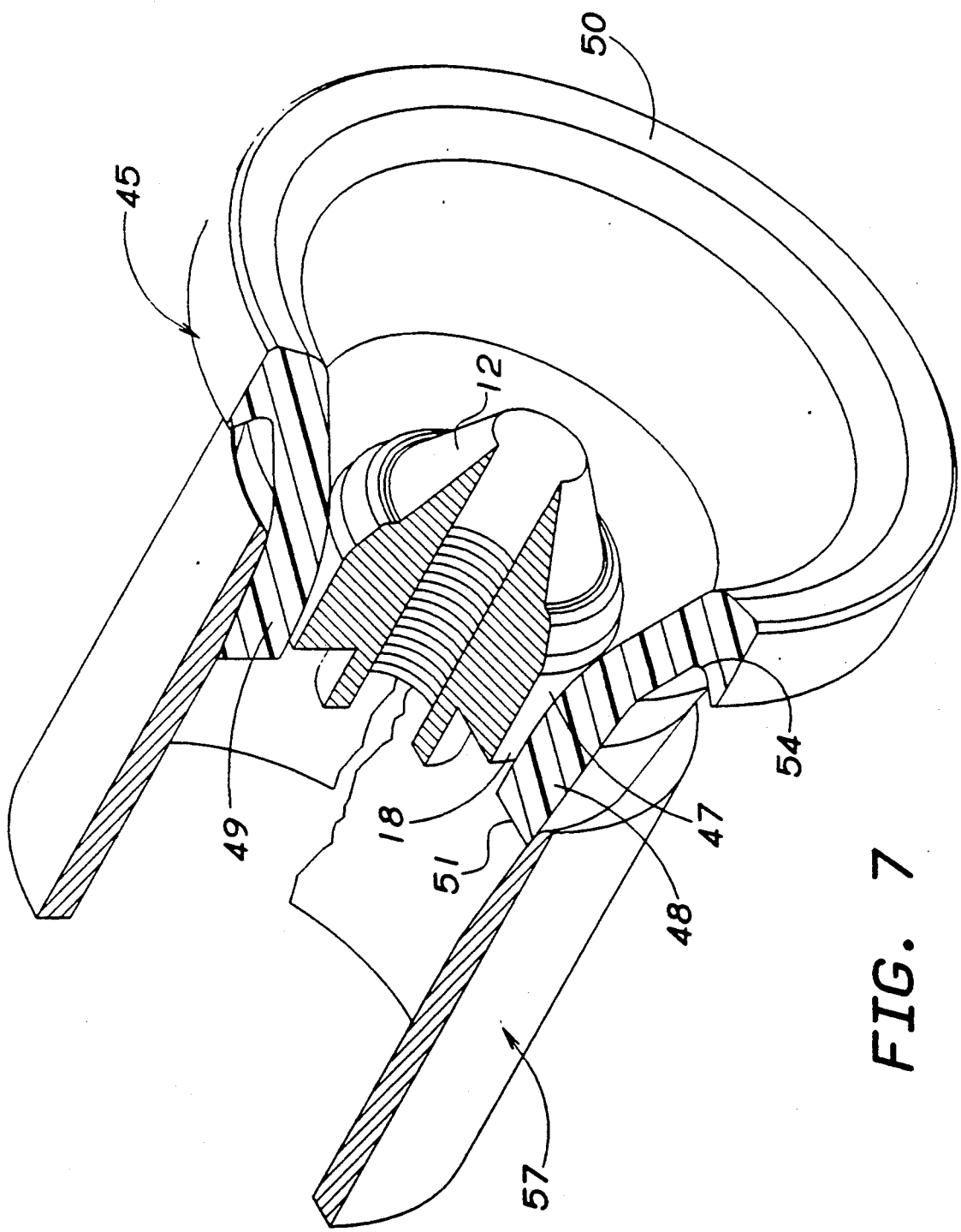
FIG. 7 is a greatly enlarged sectional view of the elastic die ring, orifice forming pin and camming piston, with the die ring shown in split open and closed positions.

In accordance with the main feature of the invention, an elastic annular die ring indicated generally at 45, is mounted concentrically about pin 12 and forms the adjustable annular extrusion orifice 18 with the outer annular surface 47 of pin 12 (FIGS. 5-7). Elastic die ring 45 is best illustrated in FIG. 7, and includes a conical sidewall 48 terminating in first and second annular ends 49 and 50, with annular end 49 having a smaller diameter than that of end 50. Annular end 49 terminates in a radially extending annular edge 51, which abuts an inner end of an annular retaining sleeve 52 (FIG. 5), which prevents the migration of end 49 of sleeve 50 as it undergoes dynamic deformation. Annular end 50 of elastic die 45 is formed with an annular outer undercut 54 which engages a complementary shaped annular projection 55 formed on outer die holding ring 39 for firmly mounting die 45 within the extrusion head.

In further accordance with the invention, an axially movable piston indicated generally at 57 (FIGS. 5-7), is slidably mounted for movement between retaining sleeve 52 and the front end of outer annular die hold ring 39 and an annular housing 58. Housing 58 is threadably attached at 59 to the forward end of outer annular hold ring 39 and forms an annular interior hydraulic fluid chamber 60 for effecting movement of piston 57. A pair of hydraulic ports 61 and 62 are formed in housing 58 for emitting and discharging hydraulic fluid into and from chamber 60 for slidably moving piston 57 into and out of engagement with elastic die 45. A plurality of 0-rings 64 are mounted within complementary shaped annular grooves 63 between piston 57 and annular housing 58 and outer annular hold ring 39, to provide generally fluid tight hydraulic chamber 60.

A plate 65 (FIG. 5) is mounted by a plurality of rods 66 to the front end of piston 57 and is attached to the input shaft 67 of a linear encoder 68 which is mounted on a bracket 69, for detecting the amount of axial movement of piston 57. This detection of the axial movement of piston 57 is supplied to a programmable controller or the like, which in turn controls the flow of hydraulic fluid into and from chamber 60 for regulating the size of outer extrusion orifice 18 formed between outer surface 47 of pin 12 and the interior surface of conical sidewall 48 by the axial movement of piston 57 as discussed in greater detail below.

The general construction of coextrusion head 1, including shell 2 and the flow channel forming members and reinforcing guide assembly, are well known in the art and form no particular part per se, of the present invention, but are components within which the improvements of this invention are incorporated to form the improved coextrusion apparatus and for carrying out the improved method steps of the invention, in order to vary the outer profile of tubular extrudate 19.

Elastic die ring 45 preferably is formed out of polyetherimide resin of the type distributed by General Electric Company under its trademark ULTEM and provides elastic properties of generally between two percent to five percent change which is enough variation to achieve the desired amount of gauge change desired in forming the outer profile of elastomeric extrudate 70 produced by extrusion head 1.

The operation of the improved coextrusion apparatus and method steps of the invention is best illustrated in FIGS. 5-13. Inner and outer streams of elastomeric composition 6 and 7, respectively, are fed into coextrusion head 1 from extrusion apparatus well known in the art, and move through their respective flow channels 6A and 7A, toward the respective extrusion inner and outer orifices 10 and 18, respectively.

Figure 8:
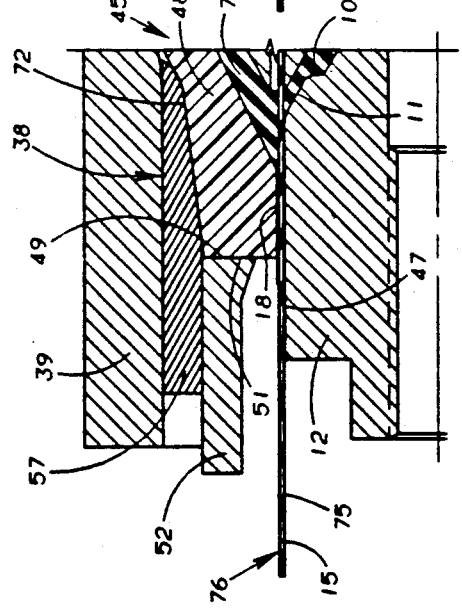
FIGS. 8-13 are enlarged fragmentary diagrammatic sectional views showing the operational sequence of varying the outer material profile of the tubular extrudate.
Figure 9:
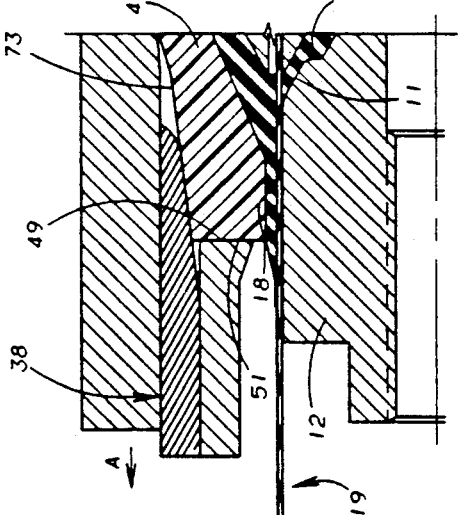

Referring to FIG. 8, piston 57 is shown at its most axially inwardly position wherein a front annular wedge-shaped camming surface 72 thereof telescopically slideably engages outer conical surface 73 of die side wall 48 and radially compresses the inside diameter of wall 48 toward annular outer surface 47 of pin 12 to reduce the size of annular outer extrusion orifice 18 formed therebetween. In this forwardmost axial position of piston 57, die 45 will be in its "closed position". In this closed position, a predetermined constant amount of elastomeric material is permitted to flow through inner orifice 10 and be deposited on reinforcing elements 15 to form an inner layer 75 of elastomeric material, and a constant predetermined amount of elastomeric material is permitted to flow through outer orifice 18 and be deposited on reinforcing elements 15 forming an outer layer 76 of elastomeric material thereon. Elastomeric layers 75 and 76 are extremely thin and provide a covering both internally and externally on reinforcing elements 15 to form tubular extrudate 19.

As discussed previously, inner flow stream 6 of elastomeric material preferably is of a particular compound to form the inner liner of tubular extrudate 19 and preferably will be of a highly fluid impervious nature to provide the air retention barrier when used in forming a pneumatic tire Outer elastomeric flow stream 7 usually is formed of a different elastomeric or rubber compound to form the body ply portion of the tubular extrudate. The particular thicknesses of inner and outer elastomeric layers 75 and 76 will vary depending upon the particular application for which tubular extrudate is intended for use.

Figure 10:
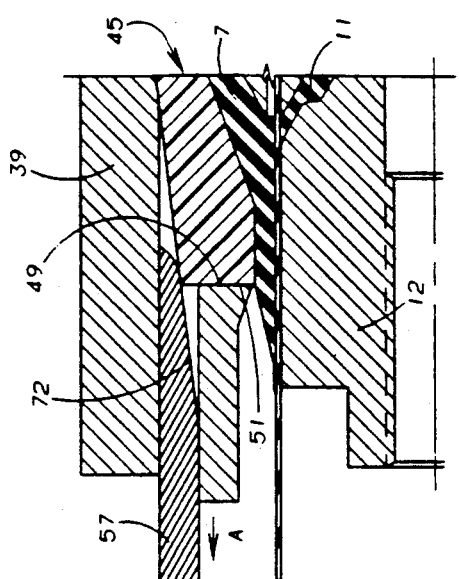
Figure 11:
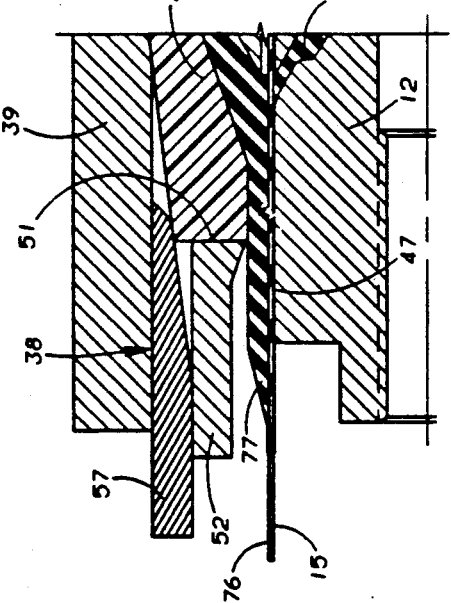
Figure 12:
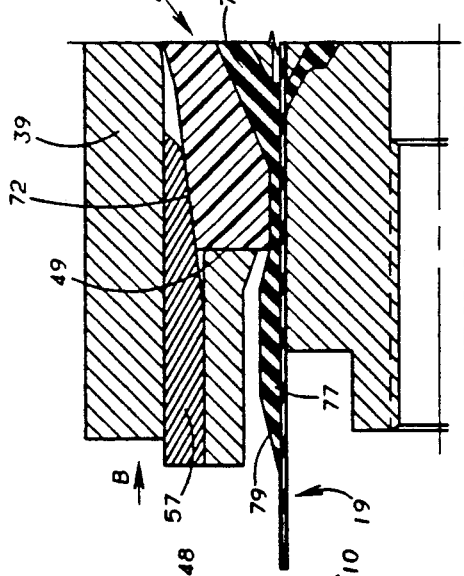
Figure 13:
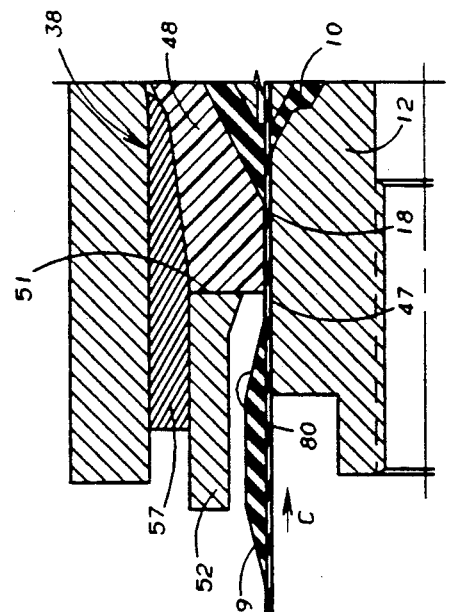
Figure 14:
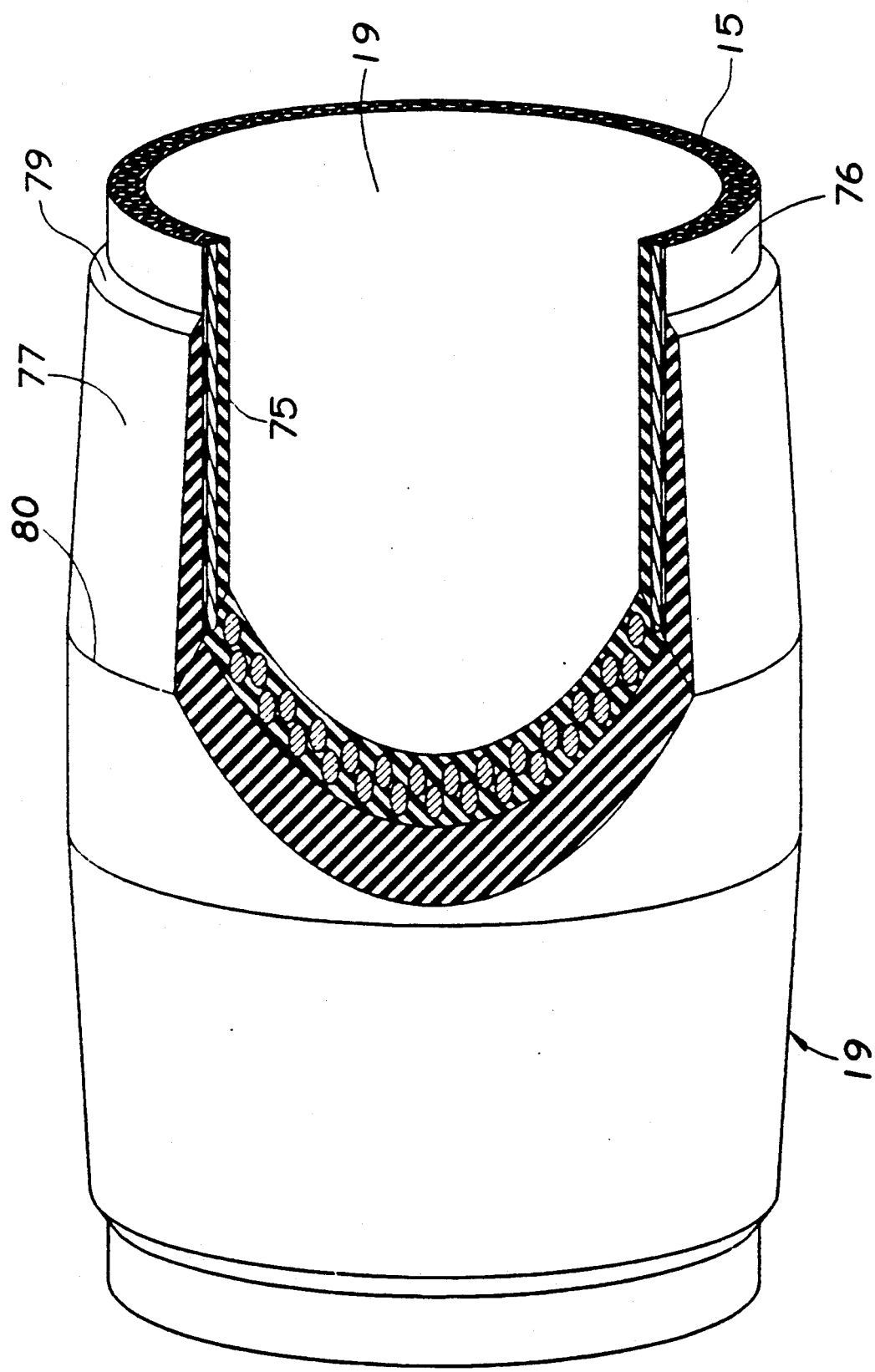
FIG. 14 is an enlarged perspective view of a tubular extrudate with parts broken away, showing the varied outer profile accomplished by the apparatus and method of the invention.

In order to vary the outer layer 76 of extrudate 19, a programmable controller of a type well known in the art, is actuated to supply hydraulic fluid into chamber 60 through port 62 causing piston 57 to move axially outwardly in the direction of arrow A (FIGS. 9 and 10), which will permit the natural elasticity of elastic die 45 to expand the annular sidewall thereof radially outwardly increasing the annular distance from annular surface 47 of pin 12 thereby increasing the size of outer orifice 18. This movement permits a layer of elastomeric material indicated at 77, to be deposited on the outer layer 76, which will continue to be applied thereto until the desired thickness is achieved as shown in FIGS. 10 and 11.

When the desired axial length of outer profile forming layer 77 is achieved, the programmable controller will introduce hydraulic fluid into port 61 of chamber 60 forcing piston 57 axially inwardly in the direction of arrow B (FIG. 12), whereby camming surface 72 thereof will move annular end 49 of die 45 radially inwardly toward pin surface 47 reducing the size of extrusion orifice 18. This movement continues until reaching the closed position of FIG. 13, in which only the predetermined amount of outer elastomeric layer 76 is flowing through orifice 18 for depositing on reinforcing elements 15 to form tubular extrudate 19. Extrudate 19 will continue to move in the direction of arrow C (FIG. 13), with only the minimum inner and outer coatings being applied to reinforcing elements 15 until another outer profile variation is desired which again is achieved by actuation of piston 57 and the camming action of surface 72 thereof with elastic die 45.

The inside diameter of elastic die end 49 is varied only approximately 2 to 5 percent which has been found to achieve and enable the desired thickness of elastomeric material 77 to be applied on outer layer 76 for most tire body ply applications. The elastic limits of die 45 are not exceeded and therefor this modulation sequence discussed above, can be repeated for a considerable number of cycles until a replacement of die 45 is required.

Although the above sequence described and shown in FIGS. 8-13, shows the camming action of piston 57 maintaining die 45 in its closed position, it is readily understood that other piston camming arrangements can be devised without affecting the concept of the invention. For example, die 45 may have a smaller inside diameter which in its usual at rest or unstressed position is in the closed position and is forcibly expanded outwardly by the pressure of the extrudate stream flowing through orifice 18. The camming action of piston 47 allows the die to expand outwardly a predetermined amount until the desired opening size of annular orifice 18 is reached to provide for layer 77 being deposited on the tubular extrudate. This elastic die is referred to as a normally closed die wherein the diameter of inner end 49 in its at rest condition permits only the desired thickness of outer layer 76 to flow through orifice 18 and the pressure of the elastomeric material then stresses the elastic die which expands outwardly, the amount of which is controlled by piston 57.

Die 45 may be a normally open die wherein inner end 49 has a larger inner diameter with piston 57 moving the die wall radially inwardly to control the size of outer orifice 18. The natural elasticity of the die material will enlarge the die orifice as camming die surface 72 moves axially away from the die. Thus, elastic die 45 can be either a normally open or a normally closed die with respect to the outer profile layer 77 without affecting the concept of the invention. Also as shown in FIGS. 9-13, the movement of the die will provide for a beginning ramp 79 and an ending ramp 80 of elastomeric layer 77 to provide for a smooth transition with the outer elastomeric layer 76.

Furthermore, computer control preferably is utilized to control the tension of reinforcing elements 15 entering coextrusion head 1, and the flow rate of streams 6 and 7 by controlling the output of the associated external extruders. The relationship between the flow rate of streams 6 and 7 will determine the thickness of the coating or covering on both sides of elements 15 and the thickness of outer layer 76.

Likewise, as discussed above, the amount of movement of orifice 17 by the pressure of the elastomeric material will effect the thickness of the elastomeric material applied for varying the outer profile, with the pressure of the incoming streams being dependent upon the flow rate from the extruder. Therefore, controlling the flow rate from the external extruders in combination with the speed of incoming reinforcing elements 31 and the control of piston 47, enables various thickness of elastomeric coatings on the reinforcing elements and on the outer profile of the extrudate to be achieved. These various parameters will be interconnected and controlled by an appropriate computer, microprocessor, programmable controller or the like, in order to achieve these desired results.

Accordingly, the improved apparatus and method of the invention provides for the accurately controlled application of an outer layer of an elastomeric material onto the surface of a continuously produced tubular extrudate to provide a smooth, preferably ramped initiation and cutoff of the outer layer with the extrudate, by the camming surface of an axially movable piston engaging an annular elastic die for adjusting the size of the outer extrusion orifice.

Accordingly the coextrusion apparatus and method is simplified, provides an effective, safe, inexpensive, and efficient device and method which achieves all the enumerated objectives, provides for eliminating difficulties encountered with prior devices and methods, and solves problems and obtains new results in the art.

In the foregoing description, certain terms have been used for brevity, clearness and understanding; but no unnecessary limitation are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved coextrusion apparatus and method is constructed and carried out, the characteristics of the construction and method, and the advantageous, new and useful results obtained; the new and useful structures, devices, elements, arrangements, parts and combinations, and method steps are set forth in the appended claims.

We claim:

1. Coextrusion apparatus for varying the outer profile of a generally tubular extrudate, including die means for forming inner and outer annular extrusion orifices for forming the tubular extrudate, said die means having an elastic radially moveable die ring adjustably forming the outer extrusion orifice, said elastic die ring having a generally conical sidewall terminating in first and second annular ends forming openings, with said first end opening having a smaller diameter than said second end opening; first means for forming an outer flow channel for delivering a first stream of elastomeric material to the outer extrusion orifice of the die means to form an outer layer of the tubular extrudate; second means for forming an inner flow channel for delivering a second stream of elastomeric material to the inner extrusion orifice of the die means to form an inner layer of the tubular extrudate; and third means for controlling the flow of the first stream of elastomeric material through the outer extrusion orifice to change the amount of said elastomeric material passing through said orifice to vary the profile of said outer layer, said third means having an axially moveable member engageable with the conical sidewall of the elastic die ring for varying the diameter of the first end opening of said die ring to vary the size of the outer extrusion orifice.

2. The coextrusion apparatus of claim 1 which the first end of the elastomeric die ring has a radially extending edge which abuts a retaining sleeve to prevent migration of said first end upon engagement of the conical sidewall of the elastic die ring by the axially moveable member.

3. The coextrusion apparatus defined in claim 1 in which the axially moveable member has a wedge-shaped camming end which telescopically slidably engages the outer surface of the elastic die ring.

4. The coextrusion apparatus defined in claim 3 in which the axially moveable member is a piston; and in which the piston is hydraulically actuated for slidably moving the camming end thereof into engagement with the elastic die ring.

5. The coextrusion apparatus defined in claim 1 in which motion detection means is operatively connected to the axially moveable member for detecting the amount of linear axial movement of said member.

6. The coextrusion apparatus defined in claim 1 in which pin means having an annular portion is located within the first annular end of the die ring to form the outer extrusion orifice therebetween.

7. The coextrusion apparatus defined in claim 6 in which the pin means includes a shaft which supports the annular portion thereof within the first end of the die ring; and in which the shaft is located within a hollow interior of a flow tube and defines therewith a portion of the inner flow channel for delivering the second stream of elastomeric material to the inner extrusion orifice to form the inner layer of the tubular extrudate.

8. The coextrusion apparatus defined in claim 7 in which a reinforcing guide element is mounted between the inner and outer flow channels for directing a plurality of individual reinforcing elements through the annular outer orifice for introduction into the streams of elastomeric material.

9. The coextrusion apparatus defined in claim 7 in which the inner extrusion orifice is located upstream of the variable annular outer orifice.

10. The coextrusion apparatus defined in claim 9 in which the size of the inner extrusion orifice is generally fixed during the formation of the tubular extrudate; and in which the outer extrusion orifice is movable between selected positions to vary the amount of elastomeric material on the outer surface of the tubular extrudate formed by the inner and outer extrusion orifices.

11. The coextrusion apparatus defined in claim 10 in which the first and second streams of elastomeric materials are of different rubber compositions.

12. The coextrusion apparatus defined in claim 11 in which the second stream of elastomeric materials is of a greater fluid imperviousness than that of the first stream of elastomeric material.

13. The coextrusion apparatus defined in claim 1 in which the natural elasticity of the die ring expands the inside radius of the first end opening to increase the size of the outer extrusion orifice.

14. The coextrusion apparatus defined in claim 1 in which the inside radius of the first end opening of the die ring varies up to generally five percent.

15. The coextrusion apparatus defined in claim 1 in which the elastic die ring is formed of a polyetherimide resin.

16. A method for varying the outer profile of a generally tubular extrudate during the formation of said extrudate, including the step of:
  a) producing an outer independently controlled continuous annular hollow stream of elastomeric material moving axially within an extrusion head;
  b) producing an inner stream of elastomeric material within said coextrusion head which joins with the outer stream to form the generally tubular extrudate;
  c) forming an annular extrusion orifice through which the outer stream of elastomeric material moves to form the tubular extrudate by providing an annular elastic die member having a conical sidewall and terminating in first and second annular ends forming first and second openings respectively, with said first opening forming the extrusion orifice; and varying an amount of pressure exerted on the conical sidewall of the elastic die member by an exterior axially moveable member to vary the size of the extrusion orifice by varying the size of the first end opening of said elastic die member to vary the amount of elastomeric material moving through the extrusion orifice from the outer stream to vary the outer profile of the extrudate.

17. The method defined in claim 16 including introducing a plurality of filament-type reinforcing elements into the streams of elastomeric material.

18. The method defined in claim 16 including passing the inner stream of elastomeric material through a fixed annular orifice to form a portion of the tubular extrudate; and passing the outer stream of elastomeric material through the variable annular orifice formed by the first end of the elastic die member downstream of the fixed annular orifice for merging with said inner stream to form the tubular extrudate.

19. The method defined in claim 18 including intermittently varying the thickness of the outer stream of elastomeric material being merged with the inner stream of material.

* * * * *